June 1, 1943.                S. W. WEBSTER                2,320,901
                           WATER COOLED CATHEAD
                           Filed June 8, 1940              2 Sheets-Sheet 1
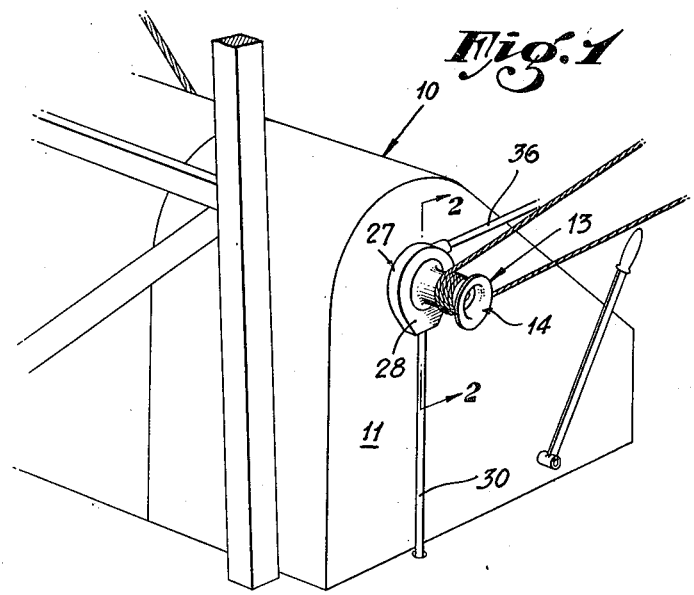
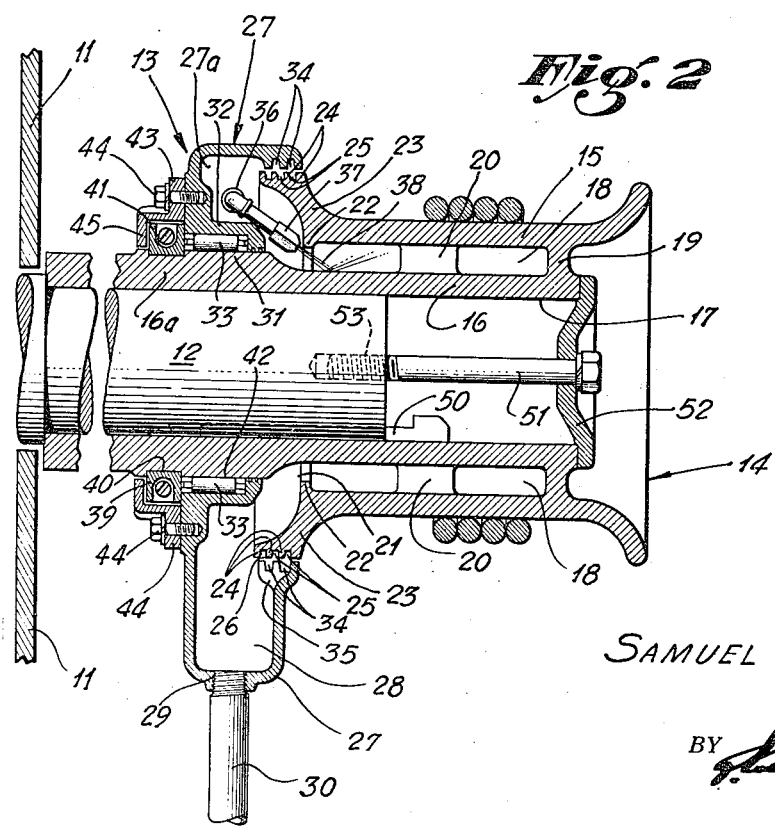
SAMUEL W. WEBSTER,
INVENTOR:
BY
ATTORNEYS.

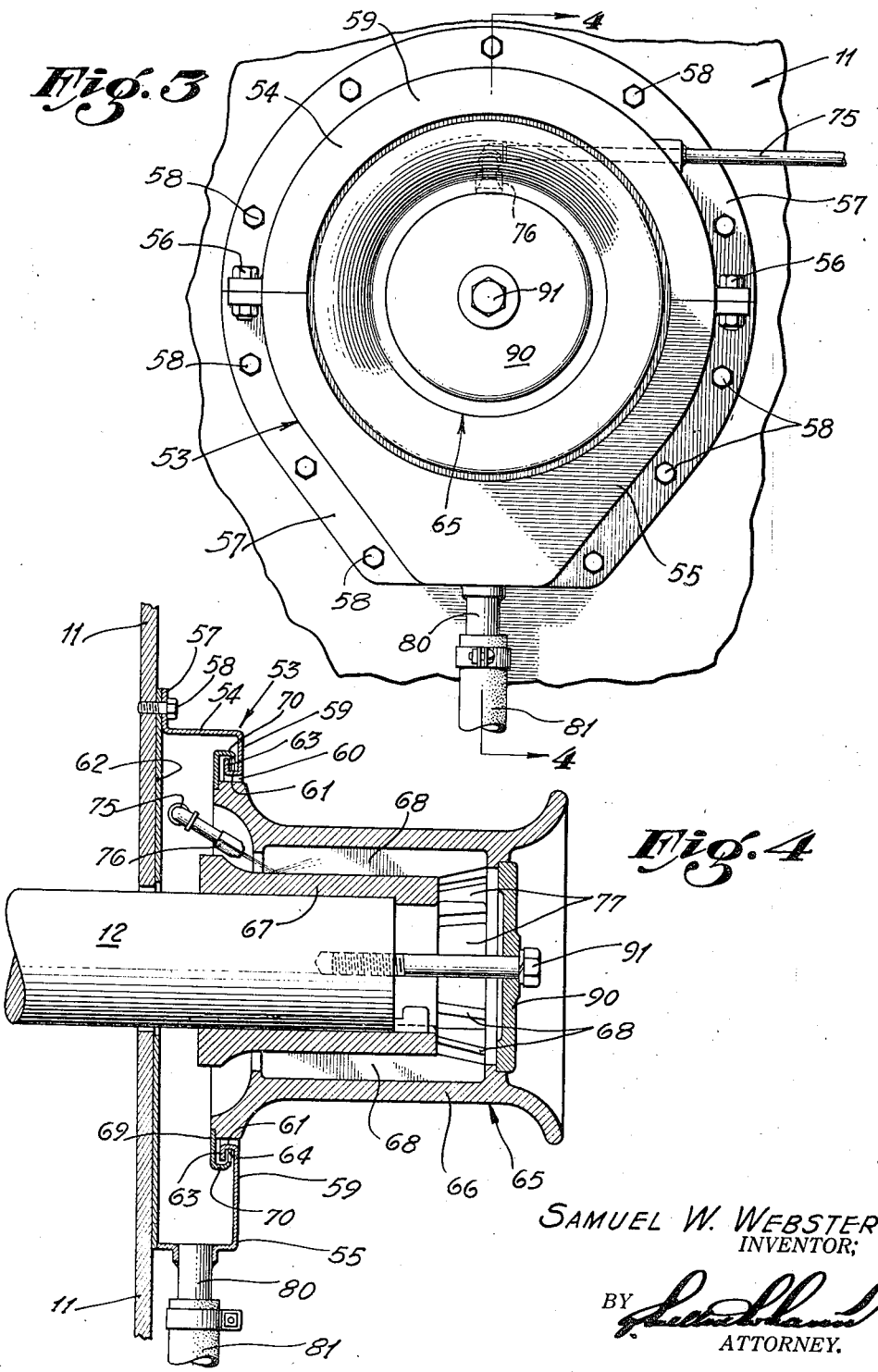

Patented June 1, 1943

2,320,901

UNITED STATES PATENT OFFICE 2,320,901

WATER COOLED CATHEAD

Samuel W. Webster, Houston, Tex., assignor to Emsco Derrick & Equipment Company, Los Angeles, Calif., a corporation of California Application June 8, 1940, Serial No. 339,505

3 Claims. (Cl. 242—117)

My invention relates in general to equipment employed in the well drilling art and relates more particularly to a cathead having means for cooling the same.

The device known in the well drilling industry as cathead comprises a spool ordinarily arranged for rotation at one end of the drawworks of the drilling rig. The purpose of this cathead spool is to apply force to a line or rope to pull the line forward or to hold the same in tension. As an example of the use of the cathead spool, the workmen on the derrick may attach a rope to an article which is to be held or moved and, extending this rope to the cathead will coil several turns of rope around the cathead, which at the time may be in rotation. Tension is then applied to the free end of the rope so as to tighten the coil upon the spool so that force will be transmitted frictionally from the spool to the rope. In the foregoing manner the spool is employed to apply tension to the rope so as to hold the rope against a reacting force or to cause the rope to be spooled forward, the movement of the rope being controlled by loosening and tightening of the coil of rope around the spool so as to vary the force frictionally transmitted from the spool to the rope. Under some conditions of operation the cathead spool will heat up very rapidly.

It is an object of my invention to provide a cathead assembly adapted to be readily secured to existing drawworks structures, this cathead comprising a spool chambered so as to receive a refrigerant, and means for passing a suitable refrigerant, preferably water, through the chamber of the spool.

It is an object of the invention to provide a cathead spool having an opening leading thereinto from one end of the spool, means for passing water into the interior of the spool through the opening at the end of the spool, and means at the same end of the spool to receive the refrigerant which discharges from the spool after it has absorbed heat.

A further object of the invention is to provide a water cooled cathead assembly having a chambered spool and means at one end of the spool and supported directly upon the shaft which carries the spool, for causing circulation of water through the chambers within the spool. An advantage of this form of my invention is that it may be readily applied to the projecting end of any shaft of suitable diameter as a self contained unit.

Further objects and advantages of my invention will be brought out in the following part of the specification.

Referring to the drawings which are for illustrative purposes only:

Fig. 1 is a fragmentary perspective view showing a portion of a rotary drawworks with my new cathead projecting therefrom.

Fig. 2 is an enlarged cross-section taken on a plane indicated by the line 2—2 of Fig. 1.

Fig. 3 is an end view of an alternative form of my invention.

Fig. 4 is a cross-section taken on a plane represented by the line 4—4 of Fig. 3.

In Fig. 1 of the drawings I show a rotary drawworks 10 of the enclosed type now in general usage, this drawworks having an end wall 11, as shown in Fig. 2, through which a shaft 12 projects for support of a cathead in a position exposed at the end of the drawworks. On the projecting end of this shaft 12 I have shown a self contained water cooled cathead unit 13 forming one embodiment of my invention.

The cathead unit 13, as best shown in Fig. 2, comprises a cathead spool 14 having an outer wall 15, a portion of which is cylindrical, and an inner wall or quill 16 provided with a bore 17 to receive the end of the shaft 12. The relative sizes of the walls 15 and 16 are such that a cylindric chamber 18 is formed within the spool and in communication with the outer wall 15. The outer end of the chamber 18 is closed by a radial wall 19, and several webs 20 may be extended from the hub 16 to the outer wall 15 at suitable intervals. The chamber 18 is open at one end of the spool 14, namely, the ends of the spool 14 faced toward the wall 11 of the drawworks, and this communication of the chamber 18 with the exterior is accomplished through an annular opening 21 formed between the wall of the hub 16 and an inwardly turned lip 22 near the end of the outer wall of the spool 14.

At the inner end of the outer wall 15 of the spool 14 a flange 23 is formed, this flange having a plurality of radially outwardly projecting annular ribs 24 separated by grooves 25. This flange 23 extends into an opening 26 in a hollow body 27 supported between the cathead spool 14 and the wall 11 of the drawworks. The hollow body has a circumscribing or circumambient channel 27a which is enlarged at 28 in the lower portion of the body 27, and this lower portion of the body 27 is provided with an outlet opening 29 to which a carry-off pipe 30 may be attached. The body 27 is supported on the shaft 12 by bearing means comprising an inner race 31, an outer race 32, and rollers 33. The inner race 31 is conveniently formed by the projecting portion 16a of the hub or quill 16, thereby making it possible to assemble the entire cathead unit before its placement on the projecting end of the shaft 12. The outer race 32 comprises a wall portion of the body 27 disposed in spaced relation to the projecting portion 31 of the quill 16 which forms the inner bearing race. The projecting portion 16a of the quill is shown broken to indicate that its length may be varied in accordance with the spacing desired for the spool 14 from the wall 11 of the drawworks 10. For the extended type of cathead, the extension 16a of the quill will be relatively long and for close-coupled use of the cathead it will be short.

The hollow body 27 has inwardly faced grooves 34 disposed around the fins 24 of the spool 14, these grooves being arranged to readily drain into the lower part of the hollow body 27 through a notch or opening 35. A water delivery pipe 36 extends through the upper wall of the hollow body 27 and on the inner end thereof has a nozzle 37 positioned so as to direct water jets 38 through the opening 21 into the upper portion of the chamber 18, thereby bringing this water into engagement with the outer wall 15 of the spool 14 to cool the same.

A feature of the arrangement shown in Fig. 2 is that it may be assembled as a unit prior to placement on the shaft 12. To secure the hollow body 27 in operative position, a split ring 39 is secured in a groove 40 in the quill 16a, this ring 39 constituting a grease seal which extends across the end of the bearing chamber 42 in which the rollers 33 are operative. A ring 43, having an annular space 41, is secured by screws 44 to the rear or inner face of the hollow body 27, in a position to enclose the ring 39, this ring 43 having an inwardly directed annular wall 45 to lie over the outer face of the lip 41, therey forming a thrust bearing interengagement between the rotating projection 31 and the stationary hollow body 27. A feature of the invention includes also the provision of a stop for preventing rotation of the hollow body 27, such stop means being shown as tthe drain pipe 30. As shown in Fig. 2 rotation of the hub 16 relative to the shaft 12 may be accomplished in the customary manner by means of a key 50, and to limit outward axial movement of the spool 14 on the shaft 12 I have shown an axial screw 51 which passes through an end plate 52 and has threaded engagement at 53 with the shaft 12.

In Figs. 3 and 4 I show an alternative form of the invention wherein the coolant disposal means, instead of comprising a hollow body 27 mounted for rotation relative to the shaft 12, consists in a two part shell 53 comprising upper and lower portions 54 and 55 secured together by bolt means 56 and having a flange 57 whereby the shell may be secured to the wall 11 of the rotary drawworks by means of screws or bolts 58. The shell 53 has a front wall 59 with an opening 60 defined by a narrow cylindric wall 61 which projects toward the back wall 62 of the shell 53 and has a radial lip 63 around the inner edge thereof, thereby forming around the wall 61 which forms the opening 60, an annular channel 64. In this form of the invention the spool 65 is in general similar to the spool 14. It has an outer cylindric wall 66, a hub 67 and radial fins 68 connecting the hub 67 and the wall 66. Inside the opening 60, the spool 65 is provided with a flange 69 which lies along the lip 63 and has a lip 70 in circumscribing relation to the lip 63. When the spool 65 is in rotation water which flows out over the flange 69 will be thrown centrifugally therefrom, and any water which may drip from the upper portion of the lip 70 when the spool 65 is stationary, will drop into the channel 64.

A pipe 75, for delivery of water to the device, is carried through the wall of the upper section 54, and has a nozzle 76 at the inner end thereof to direct water into the spaces 77 within the outer wall 66 of the spool 65. At the bottom of the lower section 55 there is a nipple 80 to which a drain tube, such as a hose 81, may be connected. In the form of the invention shown in Figs. 3 and 4 an end plate 90, secured in place by a screw 91, covers the outer end of the spool 65, leaving open the inner end thereof so that the spaces 77 will communicate through the opening 60 of the shell 53 with the interior of the shell.

I claim as my invention:

1. In a water cooled cathead assembly for connection to the projecting end of a shaft of a rotary drawworks, the combination of: a cathead spool unit comprising a hub and a cylindrical outer wall spaced from and connected to said hub, a closure member for one end of said cylindrical wall and a raised circumferential lip projecting inwardly from the inner surface of said outer wall at a point spaced from said closure member, the parts forming a refrigerant chamber within said spool unit open at an end of said spool unit; means to receive refrigerant from said chamber comprising a hollow body mounted on said hub at said end of said spool unit so that said hub may rotate therein, said body having an opening disposed in communication with the open end of said chamber; means carried by said body for delivering refrigerant into said chamber through said open end thereof; and a stop for preventing rotation of said hollow body as said spool unit is rotated.

2. In a water cooled cathead assembly for connection to the projecting end of a shaft of a rotary drawworks, the combination of: a cathead spool unit comprising a hub, a cylindrical outer wall spaced from and connected to said hub, a closure member for one end of said cylindrical wall and a raised circumferential lip projecting inwardly from the inner surface of said outer wall at a point spaced from said end closure member, the parts forming a refrigerant chamber within said spool unit open at an end of said spool unit through a mouth of reduced diameter formed by said inwardly directed lip; means to receive refrigerant from said chamber comprising a hollow body mounted on said hub at said end of said spool unit so that said hub may rotate relatively to said hollow body, said body having an opening disposed in communication with the open end of said chamber; and refrigerant delivery means in said hollow body positioned so as to deliver refrigerant into said chamber of said spool unit.

3. In a water cooled cathead assembly for connection to the projecting end of a shaft of a rotary drawworks, the combination of: a spool unit having a cylindrical outer wall and a hub within said outer wall in spaced relation and connected thereto, a closure member for one end of said cylindrical wall and a raised circumferential lip projecting inwardly from the inner surface of said outer wall at a point spaced from said end closure member, the parts forming a water chamber within said spool unit, said hub projecting from one end of said spool unit; a hollow body having an opening to receive said end of said spool unit from which said hub projects, said body having an inner annular wall portion lying in spaced relation to said hub; bearing means disposed between said hub and said inner annular wall portion of said body to permit rotation of said hub while said body remains non-rotative; stop means to prevent rotation of said body; water delivery means carried by said body to deliver water into said chamber; and a water outlet leading from said body.

SAMUEL W. WEBSTER.